United States Patent [19]
Pagnol et al.

[11] Patent Number: 5,929,780
[45] Date of Patent: Jul. 27, 1999

[54] METHOD OF MONITORING AND PROGRAMMING A PLURALITY OF TRANSPONDERS SIMULTANEOUSLY, AND APPARATUS FOR IMPLEMENTING THE METHOD

[76] Inventors: Frédéric Pagnol, Domaine de l'Etoile, La Gaude, France, 06610; Saak Dertadian, Villa Gaspard rue des Ecoles, Colomars, France, 06670

[21] Appl. No.: 08/985,073
[22] Filed: Dec. 4, 1997
[30] Foreign Application Priority Data Dec. 4, 1996 [CH] Switzerland ............... 2975/96

[51] Int. Cl.⁶ ........................................... H04Q 9/00
[52] U.S. Cl. ........................... 340/825.54; 340/825.35; 340/825.49; 340/505; 340/568; 340/572; 342/42; 342/44; 342/51
[58] Field of Search ............... 340/825.54, 825.49, 340/825.35, 505, 568, 572; 342/44, 51

[56] References Cited

U.S. PATENT DOCUMENTS

| 4,862,160 | 8/1989 | Ekchian et al. | 340/825.54 |
|---|---|---|---|
| 5,379,042 | 1/1995 | Henoch | 342/42 |
| 5,390,360 | 2/1995 | Scop et al. | 455/34.2 |
| 5,541,604 | 7/1996 | Meier | 342/42 |

FOREIGN PATENT DOCUMENTS

| 0161779 | 11/1985 | European Pat. Off. . |
|---|---|---|
| 0285419 | 10/1988 | European Pat. Off. . |
| 0405695 | 1/1991 | European Pat. Off. . |
| 0685811 | 12/1995 | European Pat. Off. . |
| 0689151 | 12/1995 | European Pat. Off. . |
| 8905549 | 6/1989 | WIPO . |

*Primary Examiner*—William A. Cuchlinski, Jr.
*Assistant Examiner*—Yonel Beaulieu
*Attorney, Agent, or Firm*—Baker & Botts, L.L.P.

[57] ABSTRACT

A method and apparatus for simultaneously storing a set of read/write or respond-to-order transponders located in a container. The method transmits radiation to read/write trnsponders to energize them, receives identity data transmitted by the transponders, verifies that the identity data are not subject to dispersion, transmits a data group to the transponders, and stores the data group in memories of the transponders. If the identity data are subject to dispersion, the method interrupts radiation transmission in order to deactivate the transponders and then retransmits the radiation until the data are not subject to dispersion so that the data group can be transmitted to the transponders for storage in their memories. In the case of respond-to-order transponders, a signal is also transmitted. If the identity data are subject to dispersion, the signal is retransmitted until the data are not subject to dispersion, and then the data group is transmitted to the transponders and stored in their memories. A second data group can be stored in the transponders without disturbing the first data group stored.

10 Claims, 1 Drawing Sheet

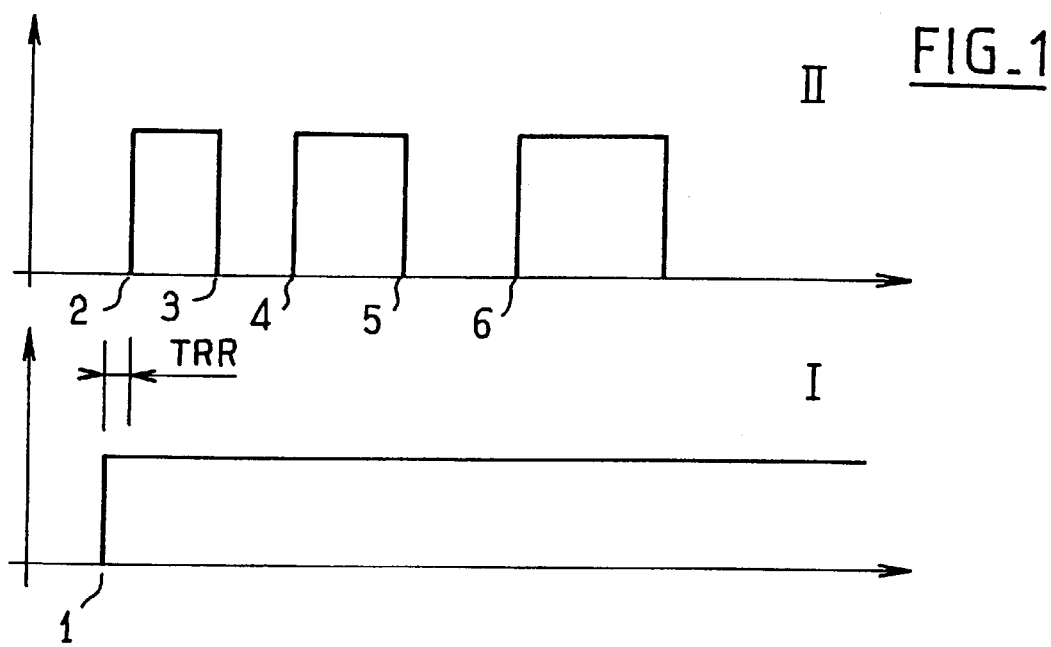
FIG._1
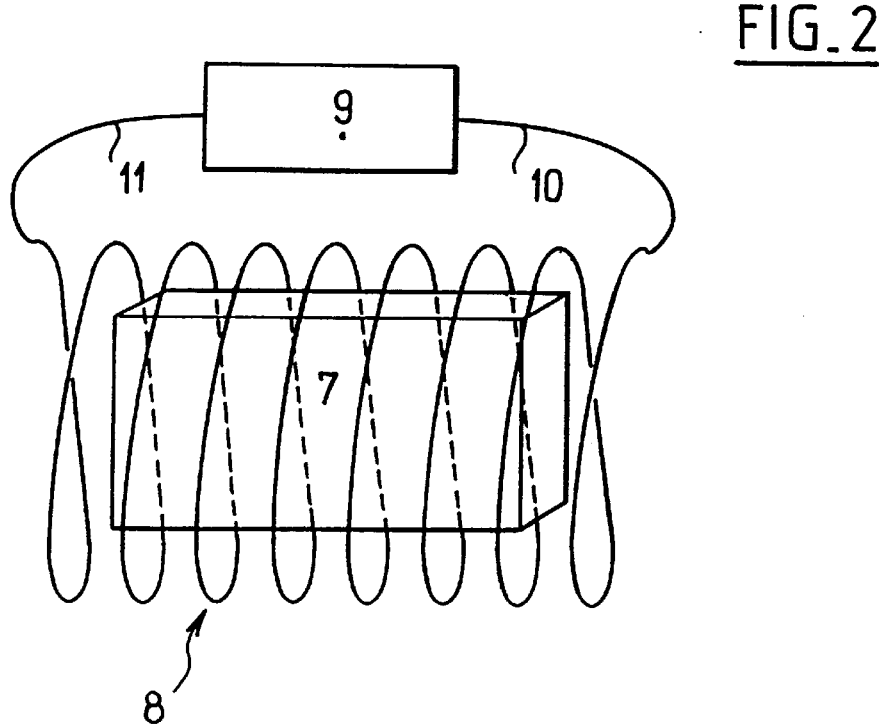
FIG._2

METHOD OF MONITORING AND PROGRAMMING A PLURALITY OF TRANSPONDERS SIMULTANEOUSLY, AND APPARATUS FOR IMPLEMENTING THE METHOD

The present invention relates to a method of monitoring and programming a plurality of transponders automatically and simultaneously, and also to apparatus for implementing the method.

BACKGROUND OF THE INVENTION

Transponders are electronic devices of small size and low cost which can be placed on objects or in a very wide variety of locations for the purpose of transmitting in predetermined form data which have been programmed in their respective memories, whenever they are subjected to external radiation having predetermined characteristics, e.g. electromagnetic radiation.

In general, such transponders do not have their own electrical power supplies, and the energy required for transmitting the data they contain is a result of the fact that the radiation sent to them and picked up by them is used, for example, to charge a capacitor which then delivers its energy to an electronic circuit of the transponder to enable it to perform the transmission that serves as a medium for the data it sends.

The responses provided by the transponders, after they have been subjected to the action of external radiation that triggers their operation, are governed by rules of a specific protocol which determines successive time intervals (or transmission windows) during which a transponder transmits the radiation which conveys the data contained in its memory, and successive time intervals (or reception windows) during which a transponder does not transmit, but during which it is capable of receiving data transmitted in the form of radiation coming from an external transmitter. This latter data can then be stored in the transponder.

It will be understood that in order to perform its function, a transponder must be associated with an external transmitter/receiver whose characteristics are such that firstly it is capable of transmitting radiation that will supply the transponder with the energy it needs, and secondly that it can receive and understand data transmitted by the transponder in its transmission windows, and can also transmit data that the transponder can receive and understand in its reception windows.

The simplest and cheapest transponders are said to be "read-only" since they cannot be programmed to record new data and are capable only of transmitting unchanged data contained in memory.

Higher performance and slightly more expensive transponders are said to be "read/write" transponders and they can receive data from the external transmitter and store it in memory for subsequent retransmission when interrogated.

Such data writable in the memory of a transponder of this type can be modified at will with the help of the external transmitter.

In a variant of this second category, transponders that are said to be "respond-to-order" transponders transmit to the external receiver only when the external transmitter instructs them so to do, thereby enabling them to be synchronized by sending the same order simultaneously to all of the transponders.

A further improved, third category of transponders is said to be "addressable", in which the transponders can be interrogated and programmed individually even when they are grouped together, however such transponders are significantly more expensive than those of the preceding category.

Transponders are presently in use in very large numbers in many fields, in particular during manufacture for the purpose of identifying objects at various stages of manufacture.

They are used in particular when manufacturing garments or other textile products to identify a large number of garment parts during manufacture, or once manufactured, what parts are contained in a common container, each part including a transponder that needs to store in its memory various kinds of data concerning the garment.

Thus, during garment manufacture, the transponder of the garment must contain in its memory a first data group concerning the type of garment, the kind and color of the fabric, and also the size.

Garments are generally manufactured in series of identical garments which are grouped together in a common container, and it is necessary to inject this first data group into the respective memories of the transponders in this series of garments.

For shipping to customers, the garments manufactured in this way are then distributed in various different containers, each capable of receiving garments of different types, different colors, and different sizes, thereby making it necessary to inject into each of the transponders a second data group concerning the identity of the customer and shipping conditions, naturally while making no changes to the data in the first group concerning, for example, the size and the color of the fabric.

In the state of the art, such programming of the various transponders associated with each garment is an operation that is difficult and expensive.

When read/write transponders are used, it is not possible to program them all simultaneously, since the transmitter will not, as a general rule, recognize them as constituting a single transponder given that the transmitter is incapable of reading simultaneously the identity signals from all of the transponders, because the signals are not synchronized.

When using addressable transponders of much higher cost, the transmitter can address each transponder individually to program in its memory the data that is to be inserted therein. However, inserting the data group into all of the articles takes a considerable length of time since it is necessary to interrogate and program in succession each of the transponders in the batch that is to be programmed.

OBJECTS AND SUMMARY OF THE INVENTION

The invention makes it possible in a manner that is simple, cheap, and fast to store a data group in the respective memories of a plurality of transponders simultaneously, the transponders being located in a common container and each of them already containing data that may differ from one transponder to another.

In the method of the invention: radiation coming from an external transmitter which supplies the energy required for transponder operation is transmitted to a plurality of transponders, e.g. all to be found in a common container and forming a batch; an external receiver picks up the identity data transmitted by the transponders during a first transmission window that is allocated to them for this purpose; the external receiver determines whether the identity data does or does not present dispersion; if said data presents dispersion, then radiation from the external transmitter is interrupted for a length of time that is sufficient to deactivate all of the transponders; the external transmitter is put back into operation and the identity data transmitted by the set of transponders during the first window for identity transmission that is allocated to them for this purpose is picked up again; and after verifying that the data does not present any dispersion, the external transmitter sends a data group in a transponder reception window, which data group is programmed simultaneously in the respective memories of all of the transponders.

If the receiver continues to perceive dispersion in identity transmission after the first attempt, that means that at least one transponder is of a type that is different from the others and needs to be changed.

In a preferred embodiment of the method of the invention, after programming in each of the transponders of several pluralities of articles data groups that are identical for each plurality, the various articles belonging to several pluralities are grouped together; radiation from an external transmitter is transmitted to the articles grouped together in this way; by proceeding in the manner described above, it is verified that the external receiver does not perceive dispersion in the first identity transmission window of the transponders; and the external transmitter sends a second data group which is programmed in the respective memories of all of the transponders.

The method of the invention is based on the fact that identical transponders, identified in the same manner, and subjected simultaneously to the same external radiation ought to transmit the identity data they contain in memory with accurate synchronization, the transmission windows being accurately interposed between the reception windows during which all of the transponders can receive and record the data that reaches them by means of the radiation from the external transmitter, and the respective identity binary signals from all of the transponders are perceived simultaneously by the external receiver.

When a transponder is different in structure from the other transponders, or when its identity has been programmed in a different manner, then the transponder transmits to the external receiver identity data having binary signals that are no longer synchronous with those from the other transponders, and this is perceived by the external receiver as unreadable dispersion in the data sent thereto by the set of transponders.

As explained before, the method of the invention is based on the fact that the external receiver is sufficiently sensitive to be able to distinguish between binary signals transmitted by a small number of transponders at a moment when nearly all of the other transponders are not transmitting binary signals and when said small number of transponders ought not to be transmitting binary signals, either.

The method of the invention serves in particular to detect circumstances where, e.g. because of their positions, certain transponders were not subjected initially to radiation from the external transmitter at exactly the same moment as the other transponders, in which case the identity transmission windows of those transponders are offset from the windows of the other transponders, thus leading to dispersion which, according to the invention, is detected.

The present invention also provides apparatus for implementing the above-described method, which apparatus comprises an external transmitter suitable for transmitting external radiation to the transponders to feed them with energy, and an external receiver suitable for detecting any dispersion in the identity data transmitted by the various transponders, i.e. identity data coming from one or more transponders without being completely synchronized with all of the other transponders.

In a particular embodiment, if the apparatus observes dispersion in the identity data transmitted by the transponders, it interrupts the radiation from the external transmitter which feeds energy to the transponders, thereby stopping them, after which it reestablishes the radiation thus synchronizing all of the transponders, and after receiving the identity data without dispersion, it sends a data group that all of the transponders record simultaneously in their respective memories.

In a particular embodiment of the invention, the external transmitter is provided with a transmission antenna in the form of a solenoid of volume and length sufficient to receive the container containing the products provided with transponders, thereby making it possible to send the radiation to all of the transponders for the purpose of feeding them with energy.

In a variant of the invention, "respond-to-order" type transponders are used, thereby enabling them to be synchronized not by sending radiation which feeds them with energy, but by the external transmitter sending a signal intended to cause all of the transponders to transmit identity data simultaneously.

In a preferred embodiment, the transmitter/receiver is provided with apparatus that modifies the characteristics of its antenna to maintain accurate tuning with the antennas of the transponders, in spite of variations in the electromagnetic environment.

BRIEF DESCRIPTION OF THE DRAWINGS

In order to make the invention better understood, there follows a description by way of non-limiting example of an embodiment thereof given with reference to the accompanying drawings, in which:

FIG. 1 shows waveform diagrams for external transmitter transmission and for the transponders; and FIG. 2 is a diagram showing one way of embodying the apparatus of the invention.

DETAILED DESCRIPTION OF THE INVENTION

In FIG. 1, the abscissa corresponds to time, and FIG. 2 is a diagrammatic view of an embodiment of the apparatus of the invention.

Waveform diagram I corresponds to radiation being transmitted from the external transmitter which delivers the energy required to enable the transponders to operate.

Waveform diagram II corresponds to the envelope of the signals transmitted during the transmission windows of the transponders.

In FIG. 1 of the drawing, point 1 on the time axis marks the time from which the radiation that powers the transponders is sent from the external transmitter. This radiation is at substantially constant power throughout the time during which it is being transmitted.

Waveform diagram II has the same time scale and shows transmissions coming from the transponder that are directed towards the external receiver.

Point 2 corresponds to the instant where, after receiving the radiation sent thereto by the external transmitter at time 1, the transponder begins to transmit a first data group that can be received by the external receiver and which serves to identify the transponder.

The window during which such identity signals can be transmitted lies between time 2 and time 3.

It may be observed that time 2 is offset from time 1 at which external radiation began to be transmitted to the transponders, with the time interval 1-2 corresponding to the delay in the response of a transponder, marked TRR in the drawing.

The data transmitted during window 2-3 is a succession of very short duration signals separated by intervals likewise of very short duration, constituting binary signals corresponding to the identity of the transponder transmitting it.

When the identity signals transmitted by all of the transponders that are being monitored are not exactly synchronous, i.e. when they do not all transmit at every instant binary signals that add constructively, the external receiver perceives signals of low intensity coming from various transponders at moments when it is not receiving any signal of normal intensity as transmitted by nearly all of the transponders. This gives rise to the signals being "dispersed" in the terminology adopted in the drafting of the present description.

Such dispersion can come from the fact that at least one transponder has received radiation that supplies it with energy not at time 1 but with a certain delay, e.g. due to the fact that it was not yet in the transmission field at time 1.

However, such dispersion can also come from the fact that when all of the transponders have indeed received the data that provides them with energy simultaneously, at least one of the transponders is identified by binary signals that are different, and as a result the signals it transmits in the window 2-3 to convey its identity are not the same as the signals from the other transponders, thereby giving rise to dispersion which is perceived by the external receiver.

In accordance with the invention, when such dispersion is perceived by the external receiver, it causes the radiation that supplies energy to the transponders to be switched off, and shortly thereafter the transponders become inactive.

The external transmitter then restarts transmission of the radiation that supplies energy to all the transponders, and at the end of the response delay time TRR, all of the transponders again transmit in transmission window 2-3.

It is then extremely probable that all of the transponders receive the radiation simultaneously, thereby enabling them to trigger their own operation simultaneously. Any transponder still not in the field of the antenna at time 1 will have been able to change its position relative to the antenna and thus find itself in the field radiated thereby.

If the external receiver receives the signals transmitted by the transponders in window 2-3 without dispersion, that means that all of the transponders have the same identity, and are properly synchronized, thereby making it possible to continue with the programming process without any risk of overwriting or destroying data already programmed in the transponders.

Otherwise, if the signals perceived by the external receiver in the window 2-3 continue to give rise to dispersion, that means that it is highly probable that at least one transponder of a different kind is mixed in with the transponders that are being monitored.

Under such circumstances, it is then appropriate to look for transponders that are not of the desired type and to remove or replace any such transponders.

This incident is unusual since, in general, transponders are delivered in batches that are completely uniform.

Under the most likely circumstances, the external receiver perceives the binary signals transmitted in the window 2-3 by all of the transponders without any dispersion, so the radiation which delivers energy to the transponders continues to be transmitted and the external transmitter selects the transponder reception window that corresponds to programming the data group that is to be stored in the transponders, and it sends the corresponding signals which are recorded by all of the transponders.

FIG. 2 is a diagram showing apparatus for implementing the method of the invention.

In this apparatus, a container 7 represented diagrammatically in FIG. 2, contains various articles, for example garments, each provided with its own transponder in which it is desired to program a data group which is identical for all of the transponders.

In accordance with the invention, the container 7 is placed inside an antenna 8 constituted by a solenoid connected to the external transmitter/receiver 9 via its end turns 10 and 11.

The dimensions of the solenoid are such that the electromagnetic field of the radiation transmitted by the solenoid is the same at all points within the container 7, and consequently at all points where the various transponders may be located.

When the container is put into position under the conditions described above, the identity data transmitted by the various transponders after energy has been conveyed to them from the external transmitter/receiver via the antenna, is completely synchronized and is perceived by the transmitter/receiver as constituting a single set of signals without any dispersion.

As described above, this makes it possible to write a new data group in each of the transponders without disturbing the data they already contain in memory.

Naturally, it is important for the radiation transmitted by the solenoid antenna 8 to be tuned to the reception frequency of the various transponders.

In a preferred embodiment of the device of the invention, account is taken of elements that disturb the electromagnetic environment in the vicinity of the apparatus, for example disturbances that can be created by motors or other electric fields. For this purpose, the transmitter/receiver 9 is associated with apparatus that modifies the characteristics of the antenna 8 so that the antenna continues to be properly tuned to the antennas of the transponders in spite of variations in the electromagnetic environment.

It can be seen that the invention makes it possible in a manner that is simple and fast to store simultaneously in the memories of all of the transponders a common data group without modifying the data which is already stored in the transponders, which data may differ from one transponder to another.

It will thus be understood that by means of the invention it is possible to associate each article provided with a transponder with successive data groups corresponding to various stages of manufacture or sale, said various data groups being recorded on each occasion simultaneously in a plurality of transponders.

The transponders and the externally located transmitter/receiver can be made using conventional techniques.

Naturally, it is necessary for transmission and reception by the transponders and by the external transmitter/receiver to have characteristics that are appropriate for enabling them to co-operate.

Naturally, the embodiment described is not limiting in any way and may be modified in any desirable manner without thereby going beyond the ambit of the invention.

We claim:

1. A method for simultaneously storing a data group in memories of a plurality of read/write transponders, said transponders being located in a container, said method comprising the steps of:

transmitting radiation to said transponders sufficient to power said transponders;

receiving first identity data transmitted by said transponders during a transmission window;

determining whether said first identity data are subject to dispersion;

if said first identity data are not subject to said dispersion, transmitting during a transponder reception window said data group to said transponders for simultaneously storing said data group in said memories of said transponders; and if said first identity data are subject to said dispersion:
   (i) interrupting transmission of said radiation for a period of time sufficient to deactivate said transponders;
   (ii) retransmitting said radiation to said transponders;
   (iii) receiving second identity data transmitted by said transponders during said transmission window;
   (iv) determining whether said second identity data are subject to said dispersion; and
   (v) if said second identity data are not subject to said dispersion, transmitting during said transponder reception window said data group to said transponders for simultaneously storing said data group in said memories of said transponders.

2. The method according to claim 1, further comprising the steps of:

storing said data group in each transponder of two or more groups of pluralities of transponders, said data group being identical for each plurality;

regrouping said several pluralities of transponders into different groups of transponders;

transmitting radiation to at least one of said different groups of transponders sufficient to power said transponders;

receiving third identity data transmitted by said at least one group of transponders during a second transmission window;

verifying that said third identity data are not subject to said dispersion;

transmitting a second data group to said at least one group of transponders; and storing said second data group in said memories of said at least one group of transponders without disturbing said data group already stored in said memories.

3. A method for simultaneously storing a data group in memories of a plurality of respond-to-order transponders, said transponders being located in a container, said method comprising the steps of:

transmitting radiation to said transponders sufficient to power said transponders;

transmitting a signal to said transponders;

receiving first identity data transmitted in response to said signal by said transponders during a transmission window;

determining whether said first identity data are subject to dispersion;

if said first identity data are not subject to said dispersion, transmitting during a transponder reception window said data group to said transponders for simultaneously storing said data group in said memories of said transponders; and if said first identity data are subject to said dispersion:
   (i) retransmitting said signal to said transponders;
   (ii) receiving second identity data transmitted by said transponders in response to said retransmission of said signal during said transmission window;
   (iii) determining whether said second identity data are subject to said dispersion; and
   (iv) if said second identity data are not subject to said dispersion, transmitting during said transponder reception window said data group to said transponders for simultaneously storing said data group in said memories of said transponders.

4. The method according to claim 3, further comprising the steps of:

storing said data group in each transponder of two or more groups of pluralities of transponders, said data group being identical for each plurality;

regrouping said several pluralities of transponders into different groups of transponders;

transmitting radiation to at least one of said different groups of transponders sufficient to power said transponders;

transmitting a second signal to said transponders;

receiving third identity data transmitted by said at least one group of transponders in response to said second signal during a second transmission window;

verifying that said third identity data are not subject to said dispersion;

transmitting a second data group to said at least one group of transponders; and storing said second data group in said memories of said at least one group of transponders without disturbing said data group already stored in said memories.

5. An apparatus for simultaneously storing a data group in memories of a plurality of read/write transponders, said transponders being located in a container, said apparatus comprising:

a transmitter that transmits radiation to said transponders sufficient to power said transponders and a receiver that receives first identity data transmitted by said transponders during a transmission window and that verifies that said first identity data are not subject to dispersion, wherein if said first identity data are not subject to said dispersion, said transmitter transmits said data group to said transponders to simultaneously store said data group in said memories of said transponders, and wherein if said first identity data are subject to said dispersion, said receiver interrupts transmission of said radiation for a period of time sufficient to deactivate said transponders, said transmitter retransmits said radiation to said transponders, said receiver receives second identity data transmitted by said transponders and verifies that said second identity data are not subject to said dispersion, and said transmitter transmits said data group to said transponders to simultaneously store said data group in said memories of said transponders.

6. The apparatus according to claim 5, wherein said transmitter comprises a transmission antenna in the form of a solenoid having a volume and a length sufficient to receive a container of products holding said transponders in order to simultaneously transmit said radiation to all of said transponders.

7. The apparatus according to claim 6, wherein characteristics of said antenna are adapted to maintain good tuning with said transponders in spite of variations in the electromagnetic environment.

8. An apparatus for simultaneously storing a data group in memories of a plurality of respond-to-order transponders, said transponders being located in a container, said apparatus comprising:

- a transmitter that transmits radiation to said transponders sufficient to power said transponders and that transmits a signal to said transponders and
- a receiver that receives first identity data transmitted by said transponders in response to said signal during a transmission window and that verifies that said first identity data are not subject to dispersion, wherein if said first identity data are not subject to said dispersion, said transmitter transmits said data group to said transponders to simultaneously store said data group in said memories of said transponders, and wherein if said first identity data are subject to said dispersion, said transmitter retransmits said signal to said transponders, said receiver receives second identity data transmitted by said transponders in response to said retransmission of said signal and verifies that said second identity data are not subject to said dispersion, and said transmitter transmits said data group to said transponders to simultaneously store said data group in said memories of said transponders.

9. The apparatus according to claim 8, wherein said transmitter comprises a transmission antenna in the form of solenoid having a volume and a length sufficient to receive a container of products holding said transponders in order to simultaneously transmit said signal to all of said transponders.

10. The apparatus according to claim 9, wherein characteristics of said antenna are adapted to maintain good tuning with said transponders in spite of variations in the electromagnetic environment.

* * * * *